US008851366B2

(12) United States Patent
Modi

(10) Patent No.: US 8,851,366 B2
(45) Date of Patent: Oct. 7, 2014

(54) MONEY TRANSFER SERVICE WITH AUTHENTICATION

(75) Inventor: Vikram Modi, Brookvale Park (SG)

(73) Assignee: Visa International Service Association, San Francisco, CA (US)

(*) Notice: Subject to any disclaimer, the term of this patent is extended or adjusted under 35 U.S.C. 154(b) by 327 days.

(21) Appl. No.: 13/204,904

(22) Filed: Aug. 8, 2011

(65) Prior Publication Data
US 2012/0066124 A1 Mar. 15, 2012

Related U.S. Application Data

(63) Continuation of application No. 10/926,652, filed on Aug. 26, 2004, now Pat. No. 8,016,185.

(60) Provisional application No. 60/585,670, filed on Jul. 6, 2004.

(51) Int. Cl.
*G06F 17/00* (2006.01)
*G06Q 40/00* (2012.01)
*G07F 19/00* (2006.01)
*G06K 5/00* (2006.01)
*G06Q 20/00* (2012.01)

(52) U.S. Cl.
USPC ............ 235/379; 235/375; 235/380; 705/75; 705/77; 705/79; 705/39

(58) Field of Classification Search
USPC .......... 235/375, 379, 380; 705/75, 77, 79, 64, 705/39, 40, 17, 21
See application file for complete search history.

(56) References Cited

U.S. PATENT DOCUMENTS

| 5,650,604 | A | * | 7/1997 | Marcous et al. | 235/379 |
| 5,920,847 | A | | 7/1999 | Kolling et al. | |
| 6,199,051 | B1 | * | 3/2001 | Gifford | 705/75 |
| 6,339,766 | B1 | | 1/2002 | Gephart | |
| 6,736,314 | B2 | * | 5/2004 | Cooper et al. | 235/380 |
| 7,711,638 | B2 | | 5/2010 | Michelsen et al. | |
| 7,729,986 | B1 | * | 6/2010 | Hoffman et al. | 705/41 |
| 7,797,233 | B2 | * | 9/2010 | Sobek | 705/39 |
| 8,041,606 | B2 | | 10/2011 | Mascavage et al. | |
| 8,055,582 | B2 | | 11/2011 | Digrigoli et al. | |
| 8,175,961 | B2 | * | 5/2012 | Reid et al. | 705/38 |

(Continued)

OTHER PUBLICATIONS

Verified by Visa Rollout, Oct. 31, 2002, www.visaeuropre.com/pressandmedia/newsreleases/press115_pressreleases.jsp.*

(Continued)

*Primary Examiner* — Daniel Walsh
(74) *Attorney, Agent, or Firm* — Kilpatrick Townsend & Stockton LLP

(57) ABSTRACT

A bank (or merchant) hosts and operates an online money transfer service (or "portal"). A sender logs into the portal and enters payment card and money transfer details and then submits the transaction. An authentication window appears displaying the sender's transaction details and the sender is prompted to enter his or her password. Upon successful authentication, the bank seeks authorization from the card issuer. Upon successful authorization, the bank credits the recipient's local bank account or existing payment card. The recipient can also receive a check, a draft, a prepaid card or cash. The money transfer service is used both cross-border and domestic to effect person-to-person money transfer. The money transfer service uses the "Verified by Visa" authentication service and VisaNet for authorization. Messages over VisaNet are used to deliver funds to a recipient.

23 Claims, 9 Drawing Sheets

(56) References Cited

U.S. PATENT DOCUMENTS

| | | | |
|---|---|---|---|
| RE44,502 E | 9/2013 | Boesch et al. | |
| 8,566,237 B2* | 10/2013 | Forzley | 705/40 |
| 8,571,980 B1 | 10/2013 | Greenwood | |
| 8,626,653 B1 | 1/2014 | Krikorian et al. | |
| 8,639,621 B1* | 1/2014 | Ellis et al. | 705/41 |
| 2001/0034703 A1 | 10/2001 | Picciallo et al. | |
| 2001/0042785 A1 | 11/2001 | Walker et al. | |
| 2002/0087467 A1 | 7/2002 | Mascavage et al. | |
| 2002/0152160 A1 | 10/2002 | Allen-Rouman et al. | |
| 2002/0198826 A1* | 12/2002 | Wasserman et al. | 705/39 |
| 2003/0022655 A1* | 1/2003 | Bogat | 455/406 |
| 2003/0046229 A1* | 3/2003 | Cresswell | 705/42 |
| 2003/0061170 A1* | 3/2003 | Uzo | 705/64 |
| 2003/0093373 A1* | 5/2003 | Smirnoff et al. | 705/40 |
| 2003/0144935 A1* | 7/2003 | Sobek | 705/35 |
| 2003/0187789 A1 | 10/2003 | Karas et al. | |
| 2003/0233317 A1* | 12/2003 | Judd | 705/39 |
| 2004/0024700 A1 | 2/2004 | Petigny | |
| 2004/0024701 A1* | 2/2004 | Hansen et al. | 705/39 |
| 2004/0030645 A1* | 2/2004 | Monaghan | 705/40 |
| 2004/0093303 A1 | 5/2004 | Picciallo | |
| 2004/0143552 A1 | 7/2004 | Weichert et al. | |
| 2004/0215963 A1 | 10/2004 | Kaplan | |
| 2004/0230527 A1 | 11/2004 | Hansen et al. | |
| 2004/0243503 A1* | 12/2004 | Eng et al. | 705/37 |
| 2005/0017067 A1* | 1/2005 | Seifert et al. | 235/379 |
| 2005/0033653 A1 | 2/2005 | Eisenberg et al. | |
| 2005/0080728 A1* | 4/2005 | Sobek | 705/39 |
| 2005/0119969 A1 | 6/2005 | Michelsen et al. | |
| 2005/0131816 A1 | 6/2005 | Britto et al. | |
| 2005/0187867 A1* | 8/2005 | Sokolic et al. | 705/39 |
| 2005/0209958 A1 | 9/2005 | Michelsen et al. | |
| 2006/0022032 A1* | 2/2006 | Fillinger et al. | 235/379 |
| 2006/0124729 A1* | 6/2006 | Martin | 235/379 |
| 2006/0218627 A1* | 9/2006 | Komatsu | 726/5 |
| 2007/0175984 A1* | 8/2007 | Khandaker et al. | 235/380 |
| 2008/0120218 A1* | 5/2008 | Reid et al. | 705/37 |
| 2008/0210751 A1 | 9/2008 | Kim | |
| 2008/0301047 A1 | 12/2008 | Fish et al. | |
| 2009/0178120 A1* | 7/2009 | Royyuru et al. | 726/4 |
| 2009/0222897 A1 | 9/2009 | Carow et al. | |
| 2010/0161486 A1* | 6/2010 | Liu et al. | 705/41 |
| 2010/0205095 A1 | 8/2010 | Ostrovsky | |
| 2011/0029396 A1* | 2/2011 | Sobek | 705/17 |
| 2011/0055077 A1* | 3/2011 | French et al. | 705/39 |
| 2011/0145020 A1 | 6/2011 | Gaset | |
| 2012/0179610 A1 | 7/2012 | Allen-Rouman et al. | |
| 2012/0209762 A1 | 8/2012 | Metaireau et al. | |
| 2012/0303525 A1* | 11/2012 | Sahadevan | 705/44 |
| 2013/0185186 A1 | 7/2013 | Blackwood | |
| 2013/0246262 A1 | 9/2013 | Battaglini et al. | |

OTHER PUBLICATIONS

Office Action mailed Oct. 15, 2013 in U.S. Appl. No. 13/204,911, 9 pages.

Office Action mailed Apr. 21, 2014 in U.S. Appl. No. 13/204,911, 13 pages.

* cited by examiner

From: TeleMoney Customer Service [mailto:telemoney_csu@rcbc.com]
Sent: Friday, January 09, 2004 1:44 PM
To: Philip
Subject: Remittance Confirmation Dear Philip, We have successfully processed your remittance instruction as follows:

| | |
|---|---|
| Transaction Date (Philippines) | : 09 January 2004 |
| Transaction Time (Philippines) | : 01:43 PM |
| | |
| Local Reference Number | : 040109000012 |
| Credit Card Number | : VISA 4388xxxxxxxxxxxx |
| Credit Card Expiry Date | : 07/2006 |
| Beneficiary Account Number Account/Php) | : RCBC 0-00-xxxxx-x (Current) |
| | |
| Charge Amount | : $ 200.00 |
| Plus Service Fee | : $   8.00 |
| Total Charge Amount | : $ 208.00 |
| | |
| Foreign Exchange Rate | : Php 54.64 to US $ 1 |
| Remittance Amount | : Php 10,900.28 |

Thank you for using TeleMoney Direct.

Confirmation to Sender Example

*FIG. 6*

Authentication Service

MONEY TRANSFER SERVICE WITH AUTHENTICATION

CROSS-REFERENCE TO RELATED APPLICATIONS

This application is a continuation of U.S. patent application Ser. No. 10/926,652, filed Aug. 26, 2004, entitled "Money Transfer Service with Authentication," which claims priority to U.S. provisional patent application No. 60/585,670, filed Jul. 6, 2004, entitled "Money Transfer Service with Authentication," which are hereby incorporated by reference.

FIELD OF THE INVENTION

The present invention relates generally to financial transactions. More specifically, the present invention relates to an Internet-based money transfer service that uses authentication to confirm the identity of the sender.

BACKGROUND OF THE INVENTION

Currently, several Internet-based money transfer services are in operation. Several of these services do not accept a payment card as a source of funds because of concerns about fraud and chargebacks. The ones that do accept payment cards generally employ one of the following authentication methods; these methods can be perceived as less than desirable.

Some services require paper-based registration where the cardholder is required to send a copy of various documents (e.g., passport, social security card, etc.) to the service by mail or facsimile so that the consumer can be authenticated. Others use an Address Verification Service ("AVS")—the cardholder is required to submit his billing address that is then verified by the payment card issuer using the AVS while authorizing the transaction. As address formats and spellings might vary, this AVS method is often inexact and inconclusive. Also, billing address data is often in the public domain and could be easily available to criminals. Other money transfer services employ a method in which token funds of a random value are credited to or debited from a cardholder's payment card or bank account. The cardholder is then required to read this random entry from his or her account statement, return to an Internet web site, and key in the same. One other technique involves inserting a random number string (usually four digits) in the merchant name or city field and also posting to the cardholder's account statement a small dollar purchase transaction. Cardholders are then required to read this random string from their statement, return to an Internet site, and key in this string.

These techniques have a number of disadvantages. For one, it is inconvenient for the cardholder because of one or more of these reasons: a) physical verification of documents is required; b) inexact and inconclusive verification results; and c) a significant time lag exists between the cardholder's first visit to the money transfer web site and the next visit to complete the transaction. High consumer attrition results from these inconveniences. These techniques are also more easily prone to fraud and do not constitute the strong authentication required for mitigating risk of fraudulent transactions and resolving cardholder repudiation (i.e., "I didn't make this transaction.") type of disputes.

A bank might choose to trust a cardholder and deliver funds to a recipient without requiring the cardholder to go through an onerous registration and authentication process, but this approach is likely to entail an unacceptable level of risk to the bank. Even once a cardholder is authenticated using some type of registration process a bank might still delay delivery of funds to a recipient until the funds actually arrive at the bank. This delay can often be two days or more and is inconvenient for the recipient.

Accordingly, there is a growing need for a quick, convenient and secure money transfer service that provides for secure authentication of a cardholder in a convenient manner and allows a recipient to receive funds immediately while providing an acceptable level of risk to a bank.

SUMMARY OF THE INVENTION

To achieve the foregoing, and in accordance with the purpose of the present invention, a service for cross-border and domestic money transfers is disclosed that uses an existing secure authentication service.

In one embodiment, a bank (or merchant) hosts and operates an online money transfer service (a "portal"). A user logs into the portal and enters payment card and money transfer details and then submits the transaction. An authentication window appears displaying the user's transaction details and the user is prompted to enter his or her password. Upon successful authentication, the bank seeks authorization from the card issuer. Upon successful authorization, the bank credits the recipient's local bank account or card. The money transfer service can be used for both cross-border and domestic transactions to effect person-to-person money transfer in a variety of situations. In one specific embodiment, the money transfer service uses the "Verified by Visa" authentication service (available from Visa International Service Association, Foster City, Calif.) and Visa's Account Funding Transaction ("AFT"). Visa's Original Credit Transaction ("OCT") can also be used to deliver funds to a recipient (formerly known as a "CFT"—Cardholder Funds Transfer).

The present invention provides a number of advantages to the cardholder. For one, there is no significant time lag between registration and a transaction: a cardholder may complete a money transfer transaction in a first session. In fact, registration or log on to the money transfer portal is offered as an optional feature without compromising on security, rather than being a mandatory requirement. Consumers are thus spared the burden of yet another user name and password specifically for the money transfer portal. The cardholder's card is used as the source of funds, and these funds can be sent from virtually anywhere in the world using an online connection. The sender thus does not need to deposit cash at a physical location.

There are also advantages for the recipient of funds. Funds can be received at virtually any location in the world; there is no waiting for funds in a specific embodiment, and the funds do not have to be picked up from an agent location. Further, the recipient does not have to pick up cash at a physical location if that is undesirable. Unlike prior art services where a bank might delay delivery of funds, in specific embodiments of the invention (where real-time authentication and authorization are provided) a bank is guaranteed payment and is thus able to deliver the transferred funds to the recipient nearly immediately.

The bank that provides the money transfer service also sees advantages. The simplified registration and transaction processes cut down on operating costs by providing an alternative for low value cross-border retail payments that are currently processed through correspondent networks. Consumer attrition due to prolonged registration and verification procedures is decreased. The strong authentication provides much more robust security than prior methods, and can constitute the proof required for non-repudiation. The sender's issuer bank gains new revenue opportunities, new customers and provides enhanced service to existing customers. The recipient's issuing bank avoids cash handling costs with the use of prepaid cards, gains new revenue opportunities, and gains access to new customers.

BRIEF DESCRIPTION OF THE DRAWINGS

The invention, together with further advantages thereof, may best be understood by reference to the following description taken in conjunction with the accompanying drawings in which:

FIG. 6 illustrates a confirmation to a sender of funds.

DETAILED DESCRIPTION OF THE INVENTION

Figure 1:
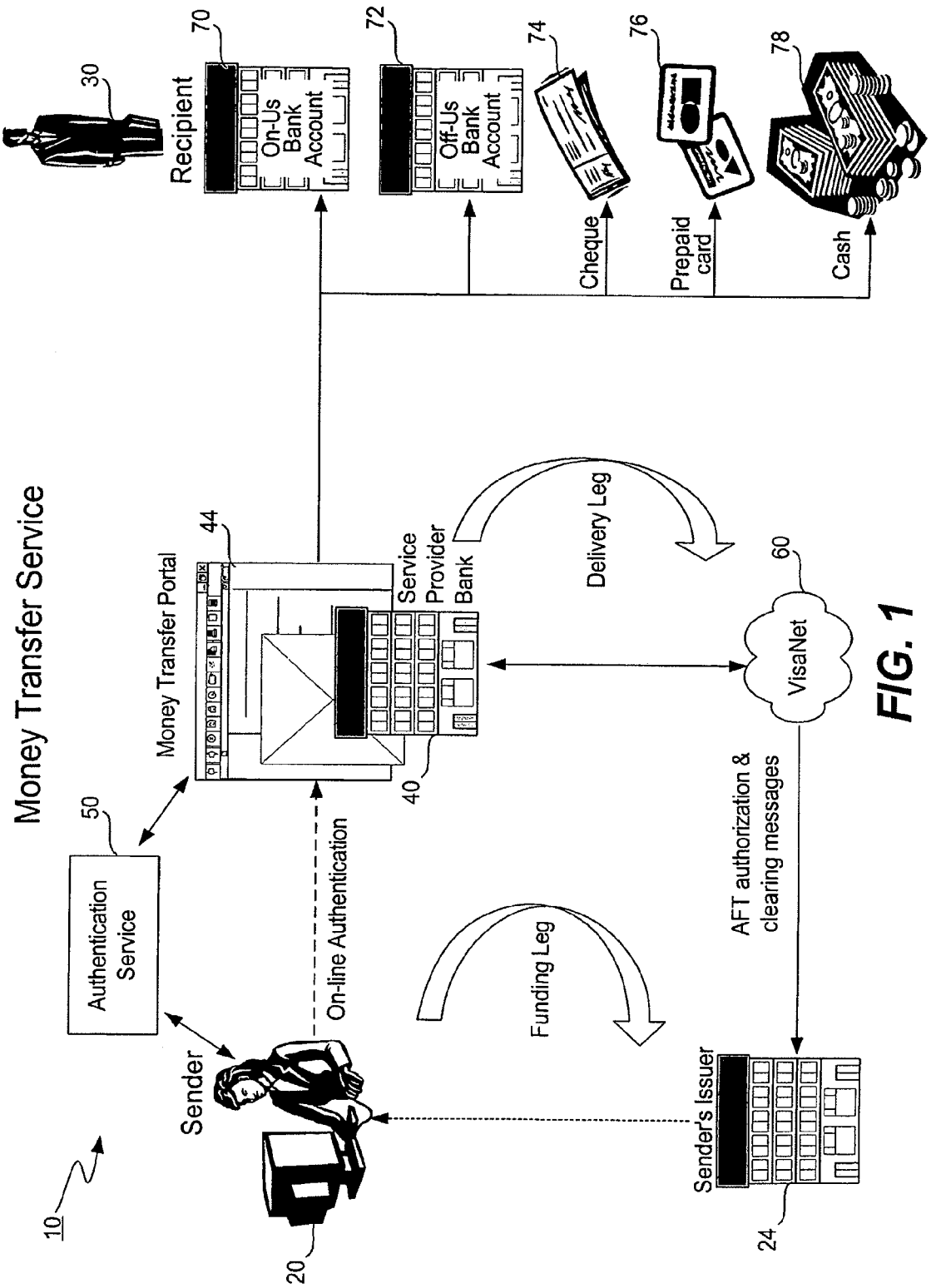
FIG. 1 is a block diagram illustrating components of a money transfer service.

The money transfer service uses an Internet-based portal with which users interact. Any bank may, by themselves or in partnership with another company, set up a money transfer portal in order to facilitate the domestic or cross-border transfer of funds from one person to another. A cardholder logs on to the online money transfer portal and transfers funds to a recipient in the same country or overseas.

For the funding leg, an individual who wishes to send money uses a payment card and internet access to initiate a remittance transaction. Once the individual has logged on to the money transfer portal, he or she provides details of the payment card used as the source of funds, the remittance order, and the identity of the beneficiary through an online form. To provide the trust element to the transaction, the portal initiates an authentication service to confirm the identity of the cardholder; authentication is successfully completed prior to the transaction being sent for authorization.

As part of this process, the individual enters his or her password to complete the authentication. The money transfer portal sends the authorization request via its acquiring bank to the individual's card issuing bank. Upon receiving an approval from the sender's issuing bank, the remittance order is confirmed. Clearing and settlement then occurs between the sender's issuing bank and the money transfer portal's acquiring bank.

The delivery leg of the remittance process allows for the money transfer portal to deliver the remittance amount to the recipient via a mode desired by the sender. The funds may be delivered to the recipient using traditional services or instruments such as: a credit to the recipient's direct deposit account through interbank clearing; a bank draft delivered to the recipient or collected in person; or a prepaid card loaded with the remittance value and delivered to the recipient. An additional mode of delivery is performed by crediting an existing payment card held by the recipient.

The present invention may be used to cover many scenarios, including: salary remittances sent by foreign-born nationals and expatriate workers to support family and friends in their home countries; support for students studying or traveling abroad; payments for online auction sales or items bought from classified advertisements; regular payments such as bills, mortgages, alimony and child support payments; gifts or charitable donations; and small businesses seeking to transfer money.

In one scenario, the money transfer service is used like a "virtual ATM" and individuals may use the service to pay others. An Automated Teller Machine ("ATM") is a physical access machine where the cardholder provides his card and a Personal Identification Number ("PIN") in order to withdraw cash from the ATM or perhaps provide the cardholder's bank with a transfer instruction. Frequently, the cardholder would use this cash to then order a demand draft or banker's check to be sent to a beneficiary. Therefore, in these instances the ATM is acting as a stage in a money transfer operation. Using the present invention, the same cardholder can access the money transfer portal any time and anywhere by providing card information and a password for authentication and be able to place instructions for the money transfer. Therefore, for instances where a typical ATM is being used for money transfer, the present invention can act as a virtual ATM and replace the need for a cardholder to visit a physical ATM. The following advantages would accrue in this scenario: access from virtually anywhere; seamless money transfer; and a bank is provided with the ability to service cardholders without investing in individual physical ATMs.

Money Transfer Service Operation

FIG. 1 is a block diagram illustrating components of a money transfer service 10. The below descriptions (together with the full disclosure herein) will be useful in an understanding of the following figures.

Sender 20 is the customer initiating the money transfer. The sender may be an individual, a small business, etc., or an agent acting on behalf of an individual. For example, people in many parts of the world do not have Internet access or a payment card. It is contemplated that such a person may visit an agent's office and request the agent send money to a recipient on behalf of the sender. The sender pays the agent in cash or in any other suitable means. The agent has previously registered (or concurrently registers) with the authentication service to obtain a password. The agent uses his or her own registration password and payment card to transfer funds to the recipient using the money transfer service.

Sender's Issuer 24 is the bank or financial institution that is the issuer of the sender's payment card, such as a credit, debit, commercial or prepaid card. Recipient 30 is the intended recipient of the funds transferred by the sender. It is also possible that the eventual intended recipient might use an agent to take possession of the funds on his or her behalf.

Money Transfer Portal 44 is an Internet web site established to collect money transfer details from the sender, obtain sender authentication and enable the delivery of the funds to the recipient. The money transfer portal can be operated by the service provider bank or by any suitable merchant.

Service Provider Bank 40 is a bank or financial institution that operates the money transfer portal, receives funds from the sender and delivers funds to the recipient. In the case of a merchant operating the portal, the service provider bank acts as an acquiring bank for the merchant. Delivery of funds is the process in which funds are delivered to the end recipient. The destination can be virtually any accepted payment means. Traditional means such as a bank account credit 70, a bank draft or check 74, domestic interbank clearing to credit an account 72 of a bank different from the service provider bank, cash 78 or a prepaid card 76 may all be used to deliver funds to the recipient. Further, funds can also be delivered directly to an existing payment card account 402 belonging to the recipient (described more fully with reference to FIG. 4). In addition, other types of accounts such as stock brokerage accounts, mortgage accounts and standard demand deposit accounts may also serve as destination accounts for the receipt of funds on behalf of a recipient.

Authentication service 50 is an Internet-based service that allows issuers to authenticate their cardholders while an electronic transaction is in progress and to notify the service provider bank (or its merchant) of the results of the authentication before the transaction continues or before an authorization request is made. Authentication service 50 is more fully described below with reference to FIG. 7.

VisaNet 60 is an example of a suitable financial network used to support and deliver authorization and clearing and settlement services. Any suitable financial network may be used to implement the present invention. For example, the "BankNet" financial network available from MasterCard International is an example of another financial network. VisaNet 60 is more fully described below with reference to FIGS. 8 and 9.

Money Transfer Service Setup

Figure 2:
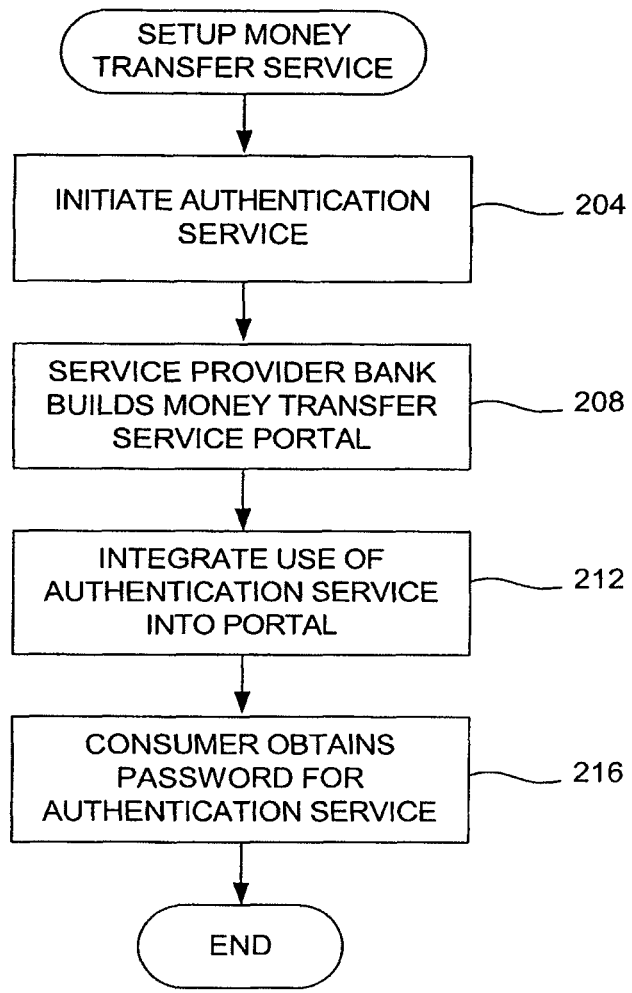
FIG. 2 is a flow diagram describing how a money transfer service is initially set up to prepare for user transactions.

FIG. 2 is a flow diagram describing how a money transfer service may be initially set up to prepare for user transactions.

In step 204 an online authentication service is identified for use with the money transfer service or a suitable authentication service is designed and built. As discussed in greater detail below, any of a wide variety of existing authentication services may be suitable for use with the present invention and one particular authentication service is identified and its use is explained. Preferably, a suitable online authentication service provides strong authentication such that a cardholder using the money transfer service to send money cannot later repudiate the transaction. A suitable service preferably has a registration component where: a) a cardholder registers in a separate session in which he or she provides details of the payment card or other means that will be used to fund the transaction; b) the cardholder provides information about himself or herself; c) the cardholder provides information to the operator of the authentication service (such as an issuing bank) allowing the operator to reach a reasonable conclusion that the person is who he says he is; and d) the cardholder receives a token (such as a password) to later use for identification during an actual money transfer transaction. In certain embodiments, it is contemplated that such a registration component may take place concurrently with the actual money transfer transaction. The means by which a sender authenticates himself or herself during an actual money transfer transaction (such as by supplying a simple password) is preferably simple enough and fast enough such that it is convenient for a user during an online transaction. In a preferred embodiment, the sender is provided with the token by his or her issuing bank, rather than by a portal. In this way, authentication takes place independent of the portal and allows guarantees to take effect. Further details regarding a specific authentication service are provided below.

In step 208 an Internet web site is designed and enabled that implements the money transfer service portal. The web site is produced by the service provider bank, on behalf of the bank, or by a company that has authorization to run the money transfer service portal and that has a merchant-acquirer relationship with the service provider bank. The web site may be implemented using any suitable technologies, user interfaces, etc. As described below, such a money transfer service portal is integrated with an authentication service and relies upon a relationship with an acquiring bank (the service provider bank) to submit and process financial transactions. Upon a reading of this disclosure, one of skill in the art would be able to implement such a portal. The below lists desirable characteristics of one specific embodiment of a money transfer service portal; other variations are possible.

The money transfer portal should provide a description of its services. For example, if providing currency conversion, exchange rates should be explicitly listed as they may vary around the world. The portal should provide customer service contact information, including electronic mail address or telephone number. The portal should post its return, refund, and cancellation policy to inform cardholders of their rights and responsibilities. A given portal might not support delivery of remittances worldwide and may instead restrict delivery to within their own country or to a limited number of countries, based on country-specific funds transfer regulations. Such country-specific funds transfers restrictions (if known) or other special conditions should be clearly stated on the portal web site.

The transaction currency should be clearly stated, including the country name when the name of the unit of currency is not unique. For example, a dollar can be an Australian dollar, a U.S. dollar, a Canadian dollar or other. Other information such as a commitment to process orders promptly, to send an electronic mail confirmation and order summary, a statement of what type of transaction security is supported and a statement encouraging cardholders to retain a copy of the transaction record should be present on the web site.

In step 212 the authentication service is integrated into operation of the money transfer portal. For example, potential users might visit the money transfer portal in order to be directed to a suitable site for registration of the authentication service. Alternatively, registration for the authentication service could take place separately from the portal. Preferably, the authentication service is integrated into operation of the portal such that when a sender is conducting a money transfer that the prompt for the sender's authentication token (such as a password) is seamless and convenient. Once authenticated, the authentication service provides a confirmation to the money transfer portal thus allowing the portal operator (or the service provider bank) the opportunity to proceed with obtaining authorization for the money transfer.

In step 216 a consumer utilizes a suitable authentication service to obtain a password for use when conducting a money transfer. Preferably, the consumer obtains the password (or token, or supplies biometric information) from his or her issuing bank; i.e., the bank that issues the payment card to the consumer. A wide variety of authentication means may be used by a particular authentication service to authenticate a consumer. For example, in lieu of a password a user might be asked to provide answers to certain private questions known only to the user (e.g., what was the name of your favorite pet?) Or, the user may be asked to supply other unique information known only to the user that might be different from what is considered to be a traditional password. Or, biometric information might be entered directly into the user's computing device (computer, PDA, mobile telephone, ATM, etc.). For example, a fingerprint scanner attached directly to such a computing device can be used to read a user's finger or thumbprint to authenticate the user. Or, an iris scanning machine may be connected to the computing device and used to authenticate the user. Other means to authenticate a user over an electronic connection are known to those of skill in the art. Once a user has a suitable authentication token or means for providing one, such a user is able to begin using the money transfer service.

Money Transfer Service Operation

Figure 3:
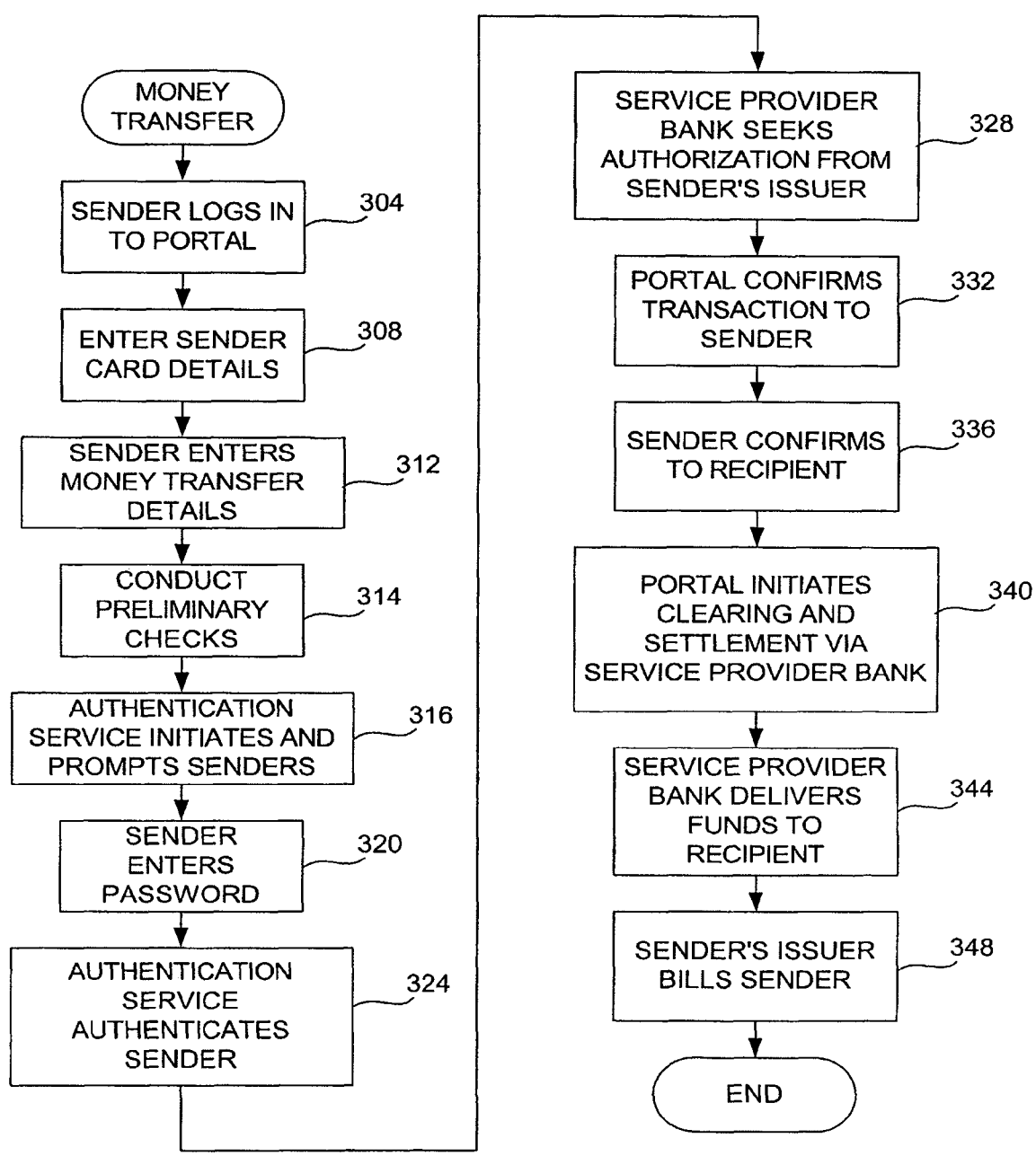
FIG. 3 is a flow diagram describing how a money transfer service moves funds from a sender to a recipient.

FIG. 3 is a flow diagram describing how a money transfer service 10 moves funds from a sender 20 to a recipient 30. In this embodiment, the recipient receives funds into an account, or via a check, cash or newly issued prepaid card.

In step 304 the sender logs into an Internet web site termed money transfer portal 44. Portal 44 is implemented as a web site as known to those of skill in the art. The connection of the sender to the portal is well known and can be as simple as providing a URL to a computer having a suitable Internet connection, and then being presented with the portal web site. The sender might be required to log into the portal by providing a user name and portal password, but this is an optional step.

In step 308 the sender enters into the portal web site payment card details for the payment card that will be used to fund the money transfer. Details such as card account number, sender name, billing address, expiry date, type of card, CVV2, etc. might all be input to the portal. In a preferred embodiment, the sender is not required to enter the CVV2 because the later authentication step provides strong authentication. In one embodiment, only the sender's name, address, card account number and expiry date are mandatory. The payment card used may be a credit card, debit card, prepaid card, commercial card or other suitable payment card, and in a preferred embodiment, these are cards issued under the guidelines and operating regulations of Visa International.

In step 312 the sender provides details on the money transfer such as amount, currency, recipient name and information on the preferred method of funds delivery. The sender may choose to have the funds delivered to a particular bank and account number, may choose to have the service provider bank issue a bank draft or check, may choose cash, or have the bank issue a new prepaid card to the recipient that stores the transfer amount. Alternatively, the sender might give the recipient some choice, by allowing the recipient to choose cash or a prepaid card when the recipient arrives at the bank. If a bank account is used, the account may be an "on-us" transaction, meaning that the service provider bank is the bank that holds the account for the recipient, or the account may be an "off-us" transaction, meaning that the recipient's bank is different from the service provider bank. In one embodiment, the sender selects from a menu of choices on the portal. Once the transfer details are entered, the sender submits the transaction for processing.

In step 314 the money transfer portal conducts any number of preliminary checks on the information obtained in step 312 to ensure that the transaction can be completed. These could include a verification that the card number entered is valid (using a standard check digit verification algorithm—this eliminates data entry errors), screening of sender's and recipient's names versus negative lists provided by regulatory agencies, and ascertaining that the transaction amount is within limits stipulated by regulatory guidelines. Such checks are well known and are done in real time without detracting from the speed or convenience of the transaction.

In step 316 the portal initiates an authentication service that will authenticate that the sender is who he says he is. A wide variety of online authentication services may be used to authenticate the sender at this point. For example, the "Secure Code" authentication service used by MasterCard International would be suitable. Other examples of authentication services are: J-Secure from JCB, SET-based systems, PKI, digital certificates etc.

In any case, one of skill in the art upon a reading of this disclosure would be able to modify an existing (or to be developed) online authentication service to work with the present invention. In one specific embodiment, the "Verified by Visa" online authentication service used by Visa International is initiated. Verified by Visa is known to those of skill in the art, and is further described below. To initiate the service, the portal behaves as a traditional merchant and submits a request for authentication to the Verified by Visa service. The service responds by involving a directory server and an access control server, connecting to the sender's computer and prompting the sender to enter his or her previously registered password (or other authentication token or means to authenticate). The access control server is controlled by the sender's issuing bank; thus, the issuer is able to authenticate the sender.

In step 320 the sender responds by entering his or her password (or other token or means) into the computer. Knowledge of the correct password authenticates the sender. Upon receipt of the correct password, in step 324 the authentication service authenticates the sender and sends a confirmation to the operator of the money transfer portal.

In step 328 the service provider bank sends an authorization request to the sender's issuer via a suitable financial network such as VisaNet 60. The authorization request is a standard authorization message that includes the result from the authentication service. In the VisaNet embodiment, the authorization request uses an AFT authorization request message. An AFT (Account Funding Transaction) is a transaction designed to supply funds to another account such as a Visa prepaid, debit, ATM card or on-line account, and is explained in more detail below. In the present invention, the AFT is paying the service provider bank for sending funds to another party. The AFT eventually will result in a debit to the sender's payment card account. Assuming that funds are available from the sender (or that credit is available), the issuer approves the transaction and the operator of the portal receives an indication via VisaNet that the authorization is successful.

In step 332 the portal confirms to the sender via an on-screen message that both authentication and authorization have been successful and that the money transfer will occur. Alternatively, or in addition, the portal may also send an e-mail confirmation message to the sender, such as the example message shown in FIG. 6. At this point, the sender may choose to log off of (or simply exit or leave) the money transfer portal web site. Once both authentication and authorization have been successful and the service provider bank has been so apprised, the service provider bank may deliver funds to the recipient and may itself be guaranteed payment of those funds. Because of this guarantee, the portal in step 332 is able to confirm to the sender that payment will be made.

In step 336 the sender confirms to the recipient that the funds will be delivered via any suitable means such as letter, telephone, short messaging service (SMS), electronic mail, instant messaging, etc. The service provider bank may also choose to alert the recipient using any of these methods.

In step 340 the operator of the portal initiates clearing and settlement by submitting a settlement file via the service provider bank into VisaNet. Within a set period of time Visa will clear and settle the transaction and move funds from the sender's issuer to the service provider bank. In step 344 the service provider bank delivers the transferred funds to the recipient. As mentioned above, once the portal receives confirmation of authentication and authorization, the service provider bank can make the funds available to the recipient in his or her bank account in real time, that is, on the order of seconds, by performing a real-time posting of funds to the recipient. If the recipient is physically present in a branch of the service provider bank, the recipient can receive a check, prepaid card or cash for the remittance amount within minutes of the confirmation. Delivery of funds can be immediate. For an "off-us" transaction, an existing electronic interbank infrastructure is used to move the funds from the service provider bank to the recipient's bank, but the recipient can still receive the funds immediately. This situation can occur when the service provider bank is located in the foreign country to which the funds are being transferred. An interbank transfer is used to perform the final domestic leg of the money transfer.

Regarding the guarantee that the service provider bank receives, this guarantee may be provided in any number of ways. For example, as the service provider bank participates in a financial network that provides authorization, clearing and settlement, the guarantee may be created by common agreement amongst those banks and associations that participate in the financial network. In one specific embodiment where the financial network is VisaNet, all Visa member banks have agreed to be bound by a set of operating regulations. These operating regulations include a provision that once a service provider bank receives confirmation of authentication of a sender and the authorization that funds are available, the service provider bank is guaranteed payment of those funds. Because of this guarantee, a service provider bank can release funds in real time to the recipient, thus providing a convenient and attractive benefit to all recipients who wish to receive funds immediately. Other methods can be used to provide a guarantee to the service provider bank (to encourage the service provider bank to release funds immediately), for example, a bilateral agreement between the parties.

In step 348 the sender's issuer bills the sender for the remittance transaction (including any service fees and fees for foreign currency conversion). This billing step is a standard transaction known the in art. For example, if the sender has used a credit card for the transfer, the charges appear on his or her credit card statement, for a debit card, the charges are deducted normally from the sender's appropriate account. If a prepaid card has been used, the charges are deducted from the sender's prepaid card account.

Alternate Money Transfer Service Operation

Figure 4:
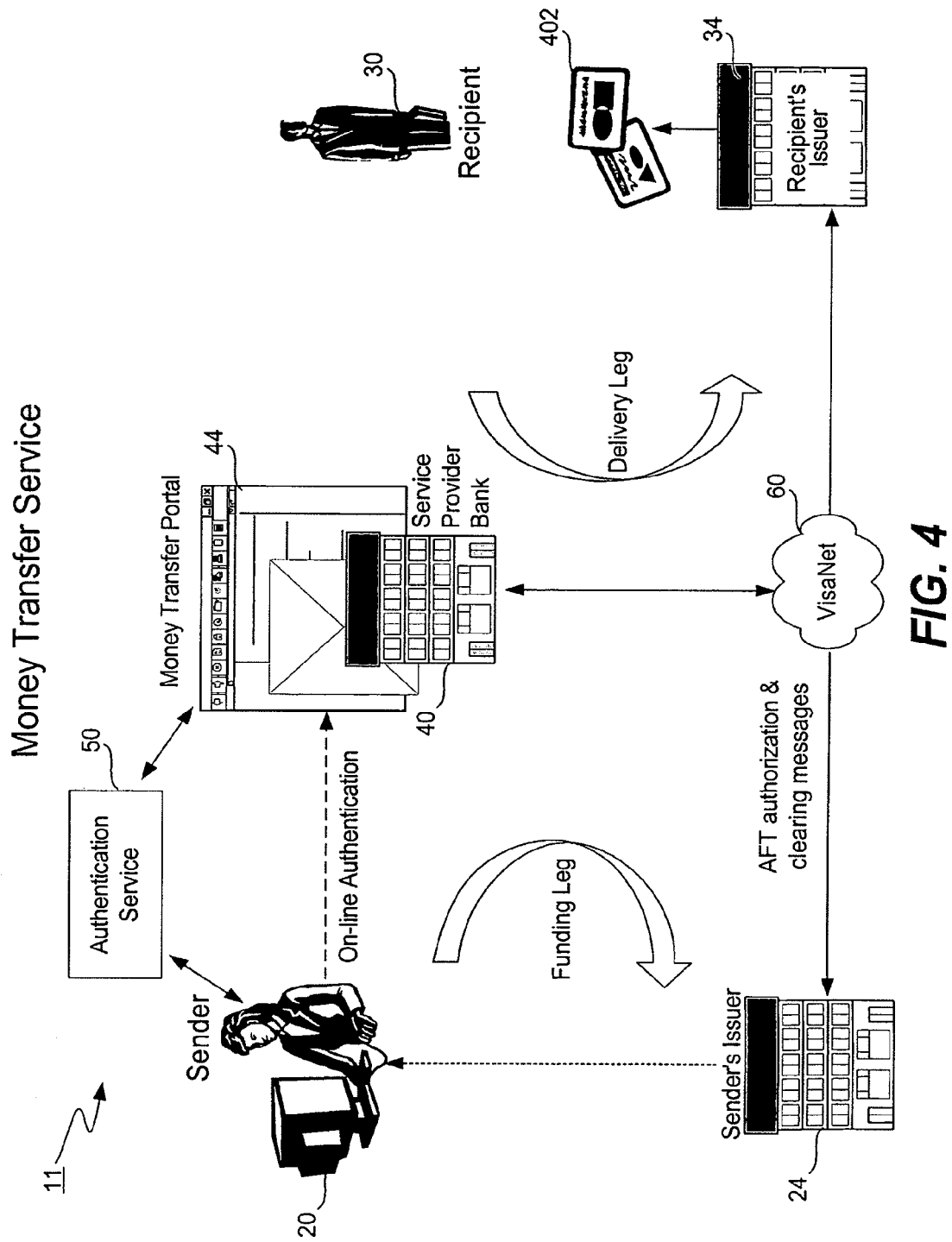
FIG. 4 is a block diagram illustrating components of an alternative embodiment for a money transfer service.

FIG. 4 is a block diagram illustrating components of an alternative embodiment for a money transfer service 11. Service 11 includes many of the same elements as FIG. I and in addition includes recipient's issuer 34, a payment card and its associated account 402, and an OCT (Original Credit Transaction) message. Recipient's issuer 34 (useful in this embodiment where the destination account is an existing payment card) is the bank or financial institution that has issued the payment card to the recipient. The recipient's issuer credits the recipient's payment card account upon receipt of the appropriate transaction from the service provider bank.

In this embodiment, the recipient's destination account is allowed to be an existing payment card account, and delivery of funds is achieved by a credit to the existing card account. The payment card 402 may be a credit card, debit card, prepaid card or other suitable payment card. An OCT message is used to submit an original credit through VisaNet to the recipient's issuer.

Figure 5:
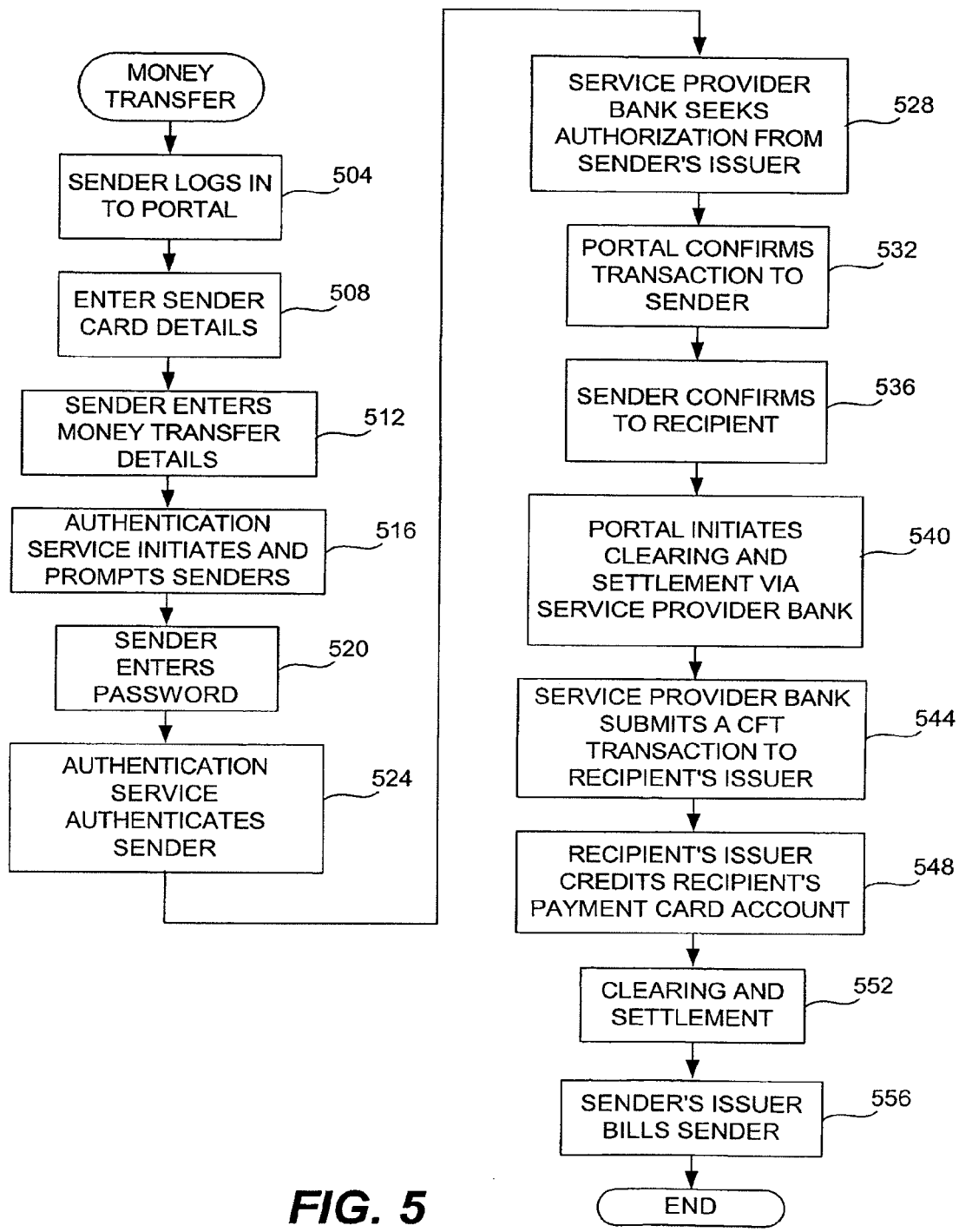
FIG. 5 is a flow diagram describing how the alternative money transfer service moves funds from a sender to a recipient.

FIG. 5 is a flow diagram describing how a money transfer service 11 moves funds from a sender 20 to a recipient 30. Steps 504 to 540 are similar to steps 304 to 340 of FIG. 3. Step 512 is a slight variation from step 312 in that the sender chooses to transfer funds to a recipient's payment card, and supplies payment card details such as the type of card, account number, cardholder name, expiry date, issuing bank and other relevant information depending upon the type of card. In step 544 the service provider bank submits an OCT transaction via VisaNet to the recipient's issuer. The result of the OCT transaction is an instruction to the recipient's issuer to credit the payment card account of the recipient; step 544 is typically performed at the end of the business day.

Use of the OCT transaction generally assumes that the service provider bank and the recipient's issuer bank are different banks. In that situation, the OCT transaction provides a convenient mechanism for money transfer. If the service provider bank and the recipient's issuer bank are the same bank, it is possible for that bank to simply perform an internal "on-us" credit posting to credit funds to the recipient's payment card. Nevertheless, it is entirely possible that when the service provider bank and the recipient's issuer bank are the same bank, that the bank will choose to execute an OCT transaction rather than use their internal systems. This situation can occur if it is more difficult for the bank to connect internal systems than it is to execute an OCT transaction.

In step 548 the recipient's issuer credits the recipient's payment card account with the amount of the transferred funds. In this embodiment, the time lag from the submission of the OCT transaction by the service provider bank to the actual credit of the recipient's card account is approximately two business days (48 hours).

In step 552 clearing and settlement occurs between the service provider bank and the recipient's issuer, i.e., the OCT leg of the transaction. Clearing and settling occurs within two business days. In step 556 the sender's issuer bills the sender for the remittance transaction (including any service fees and fees for foreign currency conversion). This billing step is a standard transaction known the in art.

Authentication Service Example

As mentioned above, any suitable online authentication service may be used to implement the present invention. In one specific embodiment, the money transfer service uses the "Verified by Visa" authentication service available from Visa International. Verified by Visa ("VbV") is an Internet-based service that allows issuers to authenticate their cardholders while an electronic commerce transaction is in progress and to notify the merchant (or other operator of a transaction web site) of the results of the authentication before the merchant (or portal operator) submits an authorization request or otherwise relies upon a representation of the cardholder. Up to this point, VbV has been used for purchase transactions, but not for money transfer. The present invention integrates VbV with a money transfer service to provide a more robust, convenient and fast money transfer service.

Figure 7:
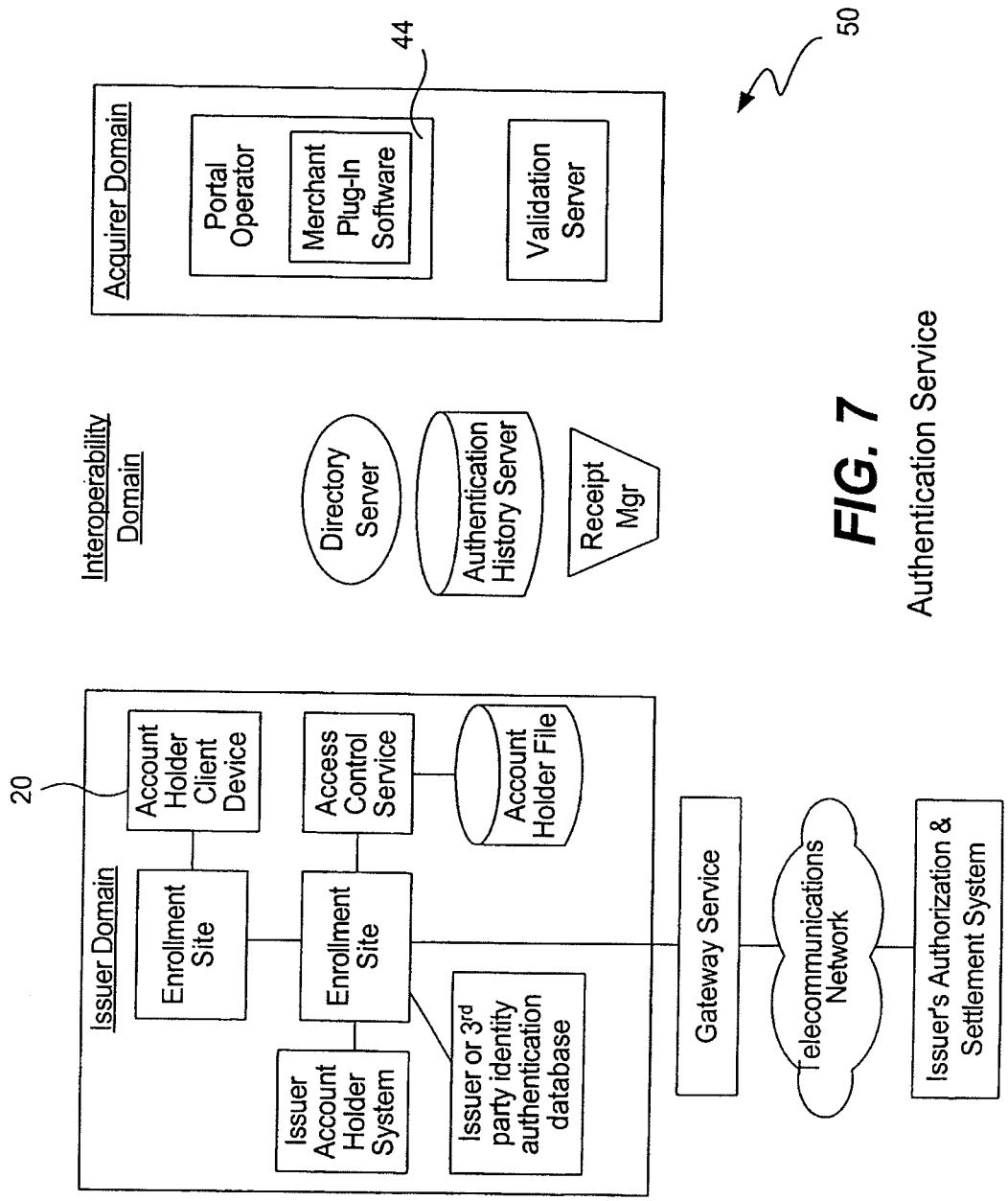
FIG. 7 is a block diagram illustrating a system architecture for the Verified-by-Visa authentication service.

FIG. 7 is a block diagram illustrating a system architecture for the VbV authentication service. Further details on the service are found in U.S. patent application Ser. Nos. 09/842,313; 10/156,271; 10/370,149; 10/660,263; and 10/838,719, all of which are hereby incorporated by reference.

Use of VbV benefits all participants by providing issuers with the ability to authenticate cardholders during an online money transfer, thus reducing the likelihood of fraudulent usage of payment cards and improving transaction performance. For a cardholder to be authenticated, both the money transfer portal operator and the issuer subscribe to the VbV service. Issuers enroll cardholders and assign them a personal password. When the cardholder is online attempting to execute an electronic money transfer the portal operator's system redirects the cardholder to the issuer's site. The issuer then presents a pop-up window to the cardholder asking for his or her personal password. The cardholder types in the password and the issuer validates and confirms authentication to the portal operator. Portal operators can use VbV to help implement a money transfer service to ensure that senders of money transfer transactions are not attempting to transfer funds from a stolen or counterfeit payment card.

Preferably, the money transfer portal ensures that the sender's issuer has been able to successfully authenticate the cardholder prior to submitting the transaction into a financial network (such as VisaNet) for authorization. The service provider bank is thus Verified by Visa enabled and has completed certification to pass relevant authentication data into the authorization message and authorization reversal messages.

During the VbV authentication process, issuers generate and send a Cardholder Authentication Verification Value (CAVV) in their authentication response to the portal operator whenever the cardholder has been fully authenticated. Acquirers pass the CAVV received from the issuer into the authorization message in order to benefit from the liability shift and interchange benefits associated with fully authenticated transactions, and as a condition to use the Electronic Commerce Indicator ("ECI" value of 5. Issuers (or Visa on their behalf) validate the CAVV prior to authorizing the transaction (similarly to CVV validation). Details of these requirements are available in APML 35/02 *Verified by Visa: Cardholder Authentication Verification Value (CAVV) Implementation and Interchange Rates*, dated 12 Dec. 2002 and in APML 01/03 *April* 2003 *VisaNet Business Enhancements Technical Letter Update Bulletin* #1, section 3.3., dated 10 Jan. 2003, each of which is hereby incorporated by reference.

After each successful authenticated transaction (as indicated by a value of "Y" for Transaction Status in the PARes) the Merchant Server Plug-in ("MPI") passes specific fields from the PARes to the portal server in order to correctly identify the transaction in the VisaNet Authorization process. The MPI provides to the portal server the following fields from the PARes for use in the VisaNet Authorization request (other authorization fields are populated as usual): Transaction Identifier; Cardholder Authentication Verification Value (CAVV); and Electronic Commerce Indicator.

For fully authenticated transactions, the PARes message sent by the issuer already contains the ECI value set to 5. Acquirer systems should be modified and certified to send the Transaction Identifier, CAVV and ECI and to receive the result of the CAVV validation and is returned by the issuer or Visa on the issuer's behalf prior to the launching of the authentication service. The above Fields are carried in the following messages: Authorization Requests, Responses and Advices; and Full Financial Requests, Responses and Advices.

Financial Network Example

VisaNet 60 includes the data processing systems, networks and operations that are used to support and deliver Visa's authorization and clearing and settlement services.

Figure 8:
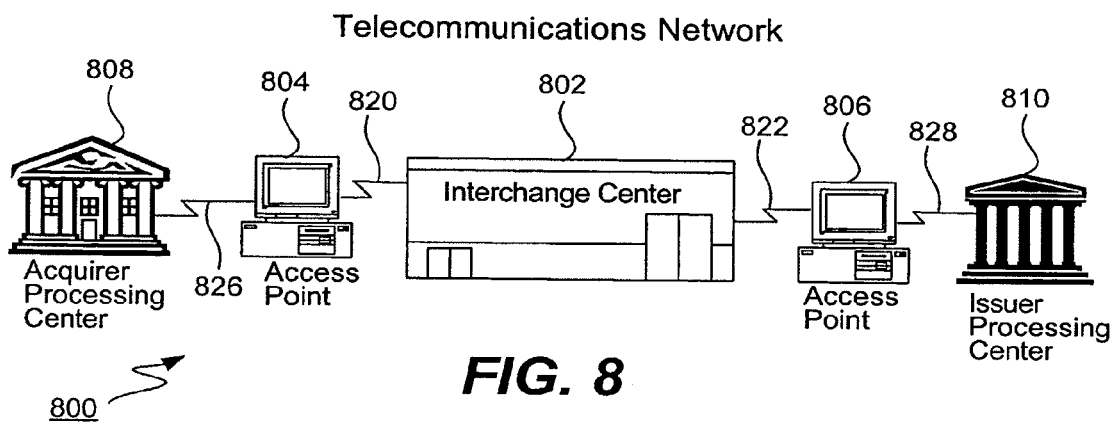
FIG. 8 illustrates a telecommunications network suitable for implementing an embodiment of the present invention.

FIG. 8 illustrates a telecommunications network 800 suitable for implementing an embodiment of the present invention. The present invention may make use of any suitable telecommunications network and may involve different hardware, different software and/or different protocols then those discussed below. The below-described network is a preferred embodiment. Network 800 is a global telecommunications network that supports purchase and cash transactions using any bankcard, travel and entertainment cards, and other private label and proprietary cards. The network also supports ATM transactions for other networks, transactions using paper checks, transactions using smart cards and transactions using other financial instruments.

These transactions are processed through the network's authorization, clearing and settlement services. Authorization is when an issuer approves or declines a sales transaction before a purchase is finalized or cash is dispersed. Clearing is when a transaction is delivered from an acquirer to an issuer for posting to the customer's account. Settlement is the process of calculating and determining the net financial position of each member for all transactions that are cleared. The actual exchange of funds is a separate process.

Transactions can be authorized, cleared and settled as either a dual message or a single message transaction. A dual message transaction is sent twice—the first time with only information needed for an authorization decision, an again later with additional information for clearing and settlement. A single message transaction is sent once for authorization and contains clearing and settlement information as well. Typically, authorization, clearing and settlement all occur on line.

The main components of telecommunications network 800 are interchange centers 802, access points 804, 806 and processing centers 808 and 810. Other entities such as drawee banks and third party authorizing agents may also connect to the network through an access point. An interchange center is a data processing center that may be located anywhere in the world. In one embodiment, there are two in the United States and one each in the United Kingdom and in Japan. Each interchange center houses the computer system that performs the network transaction processing. The interchange center serves as the control point for the telecommunication facilities of the network, which comprise high speed leased lines or satellite connections based on IBM SNA protocol. Preferable, lines 820 and 822 that connect an interchange center to remote entities use dedicated high-bandwidth telephone circuits or satellite connections based on the IBM SNA-LU0 communication protocol. Messages are sent over these lines using any suitable implementation of the ISO 8583 standard.

An access point 804 or 806 is typically a small computer system located at a processing center that interfaces between the center's host computer and the interchange center. The access point facilitates the transmission of messages and files between the host and the interchange center supporting the authorization, clearing and settlement of transaction. Links 826 and 828 are typically local links within a center and use a proprietary message format as prefer by the center.

A data processing center (such as is located within an acquirer, issuer, or other entity) houses processing systems that support merchant and business locations and maintains customer data and billing systems. Preferably, each processing center is linked to one or two interchange centers. Processors are connected to the closest interchange, and if the network experiences interruptions, the network automatically routes transactions to a secondary interchange center. Each interchange center is also linked to all of the other interchange centers. This linking enables processing centers to communicate with each other through one or more interchange centers. Also, processing centers can access the networks of other programs through the interchange center. Further, the network ensures that all links have multiple backups. The connection from one point of the network to another is not usually a fixed link; instead, the interchange center chooses the best possible path at the time of any given transmission. Rerouting around any faulty link occurs automatically.

Figure 9:
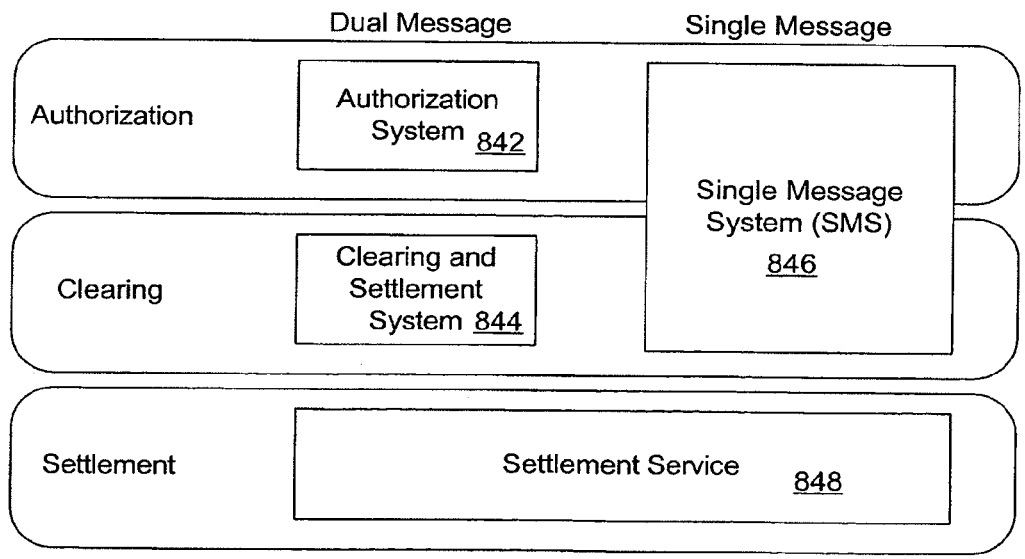
FIG. 9 illustrates systems housed within an interchange center to provide on-line and off-line transaction processing.

FIG. 9 illustrates systems 840 housed within an interchange center to provide on-line and off-line transaction processing. For dual message transaction, authorization system 842 provides authorization. System 842 supports on-line and off-line functions, and its file includes internal systems tables, a customer database and a merchant central file. The on-line functions of system 842 support dual message authorization processing. This processing involves routing, cardholder and card verification and stand-in processing, and other functions such as file maintenance. Off-line functions including reporting, billing, and generating recovery bulletins. Reporting includes authorization reports, exception file and advice file reports, POS reports and billing reports. A bridge from system 842 to system 846 makes it possible for members using system 842 to communicate with members using system 846 and access the SMS gateways to outside networks.

Clearing and settlement system 844 clears and settles previously authorized dual message transactions. Operating six days a week on a global basis, system 844 collects financial and non-financial information and distributes reports between members. It also calculates fees, charges and settlement totals and produces reports to help with reconciliation. A bridge forms an interchange between system 844 processing centers and system 846 processing centers.

Single message system 846 processes full financial transactions. System 846 can also process dual message authorization and clearing transactions, and communicates with system 842 using a bridge and accesses outside networks as required. System 846 processes Visa®, Plus®, Interlink® and other card transactions. The SMS files comprise internal system tables that control system access and processing, and the cardholder database, which contains files of cardholder data used for PIN verification and stand-in processing authorization. System 846 on-line functions perform real-time cardholder transaction processing and exception processing for authorization as well as full financial transactions. System 846 also accumulates reconciliation and settlement totals. System 846 off-line functions process settlement and funds transfer requests and provide settlement and activities reporting. Settlement service 848 consolidates the settlement functions of system 844 and 846, including Interlink, into a single service for all products and services. Clearing continues to be performed separately by system 844 and system 846.

AFT and OCT Messages

An AFT (Account Funding Transaction) is a transaction designed to supply funds to another account such as a credit, prepaid, debit, ATM or on-line account. In the present invention, an AFT is paying the service provider bank for sending funds to the recipient and results in a debit to the sender's card account. The amount of the debit is the amount of the credit to be delivered to the recipient plus any fees being charged by the service provider such as a transfer fee, or a currency conversion fee when the money transfer portal performs currency exchange and its acquirer submits the transaction in the preferred currency of the recipient.

The following details regarding use of an AFT apply to VbV and VisaNet transactions. One of skill in the art upon a reading of this disclosure will be able to apply the teachings herein to implement such financial messages in other authentication and financial network environments.

The AFT indicator is used in both the authorization and clearing and settlement transactions and is preceded by an authorization. Settlement takes place within two working days. Neither the authorization nor the clearing transaction carries any financial information about the recipient of a money transfer. The AFT carries only the account number associated with the payment card of the sender. An AFT is also accompanied by indicators, which allow the sender's card issuing bank to take appropriate authorization decisions. Indicators include channel information such as Mail Order/Telephone Order or Internet, and merchant type. A financial services association (such as Visa) performs currency conversion on AFT transactions when the currency of the sender is different from the currency accepted by the service provider. AFT indicators are used to show funds transfers instead of standard purchase transactions. For AFTs using the VbV Service, it is preferable, for security reasons, that only fully authenticated transactions are supported. Therefore the response to the authentication request should be 'Y' in the VERes and PARes. Therefore, it is preferred that the only ECI supported is the ECI '5' for AFTs.

The authorization request message is processed as an AFT. Participating acquirers should use a new pre-determined value in the authorization request to indicate an AFT transaction. Participating acquirers should be able to provide a different new value in the clearing messages to identify account funding transactions. All subsequent TCRs relating to an AFT should contain the same value in the clearing messages. The reversal message should be sent prior to the agreed timeline that is stated in the money transfer portal web site. If the cardholder cancels an approved transaction, a reversal message should be processed via the authorization system or SMS. In the case that the service provider bank hosts the money transfer portal, a specific Merchant Category Code (MCC) should be used.

The following key fields are used for an AFT and should be supported in messages and clearing and settlement transactions. The key fields are: Processing Code; Merchant Type; CAVV Result Code; Mail Order/Telephone Order/Electronic Commerce Indicator; Mail/Phone/Electronic Commerce Indicator; Transaction ID (XID); and TransStain/CAVV Data.

The messages used to support authorization and SMS VbV/AFT transactions are the following: authorization requests, responses, and advices; full financial requests, responses, and advices; authorization reversals, reversal responses, and reversal advices. Clearing and settlement requires the Transaction Code Qualifier be set to '1' in all TCRs for Account Funding Transactions. The clearing and settlement trancodes needed to support authorization and SMS VbV/AFT transactions are: Original Sales, Original Credits, Chargebacks, Representments and Reversals.

An OCT (Original Credit Transaction) is typically a clearing and settlement credit transaction designed for use in business applications such as a business money transfer or business-to-consumer repayments. When used in the context of the present invention for money transfer, the OCT is the transaction used to deliver funds to the recipient account. It is separate from, and takes place after, the AFT transaction. This timing is to ensure that payment funds are secured before funds are sent to the recipient.

The following details regarding use of an OCT apply to VbV and VisaNet transactions. One of skill in the art upon a reading of this disclosure will be able to apply the teachings herein to implement such financial messages in other authentication and financial network environments.

The OCT follows a conventional transaction flow. The amount of the OCT is the amount agreed by the sender and the service provider in the currency agreed. If the recipient's billing currency is different from the currency agreed at the transaction time, currency conversion is performed on the OCT and the exact amount credited to the recipient account will not be known at transaction time. The OCT carries only the account number of the recipient and no information about the sender. A special indicator identifies an OCT to the recipient's issuer bank. Interchange flows from the submitting acquirer to the recipient's issuer, as in a normal purchase transaction. Settlement takes place within two days. Some issuers may delay funds availability for one to three days, so that further checks can take place.

Transaction data present on an original OCT should be transcribed unchanged onto related exception transactions including chargebacks and reversals. Establishing the ability to link the delivery of funds transactions to the funding transaction is also useful. OCTs originating from clearing and settlement connected acquirers are identified by a pre-determined Transaction Code Qualifier value. No authorizations will be processed for OCTs originating from clearing and settlement connected end points. Portal operators should leave the authorization field blank or fill it with zeros. The Electronic Commerce Indicator (ECI) should be included on all Internet OCTs. The ECI is required for all Internet transactions. The money transfer portal should use a specific Merchant Category Code (MCC) to indicate Financial Institutions-Merchandise and Services for both the AFT and OCT transactions. If the cardholder cancels an approved transaction, a reversal message should be processed via the clearing and settlement system or SMS. If the clearing and settlement transaction code indicates that a credit voucher has already been processed, then a clearing and settlement transaction code indicating credit voucher reversal should be processed.

The following documents contain technical details and the implementation requirements for Verified by Visa, AFT, and OCT, and are hereby incorporated by reference. Verified by Visa is described in: *VbV Service Description; VbV Product Rules and Best Practices; VbV Test Merchant Facility User Guide; CAVV Implementation Guide; VbV Acquirer Implementation Guide; VbV Merchant Implementation Guide; VbV Merchant Plug-In Distribution Plan*; and *VbV Member and Merchant Brand Guidelines*. The AFT and OCT are described in: *VisaNet Business Enhancements April* 2002, *Member Technical Letter; VisaNet Business Enhancements April* 2002, *Member Implementation Guide; Cardholder Funds Transfer Pilot Guidelines; Cardholder Funds Transfer Operating Principles; Cardholder Funds Transfer Acquirer Best Practices Guide; and Cardholder Funds Transfer Merchant Best Practices Guide*.

Computer System Embodiment

Figure 10A:
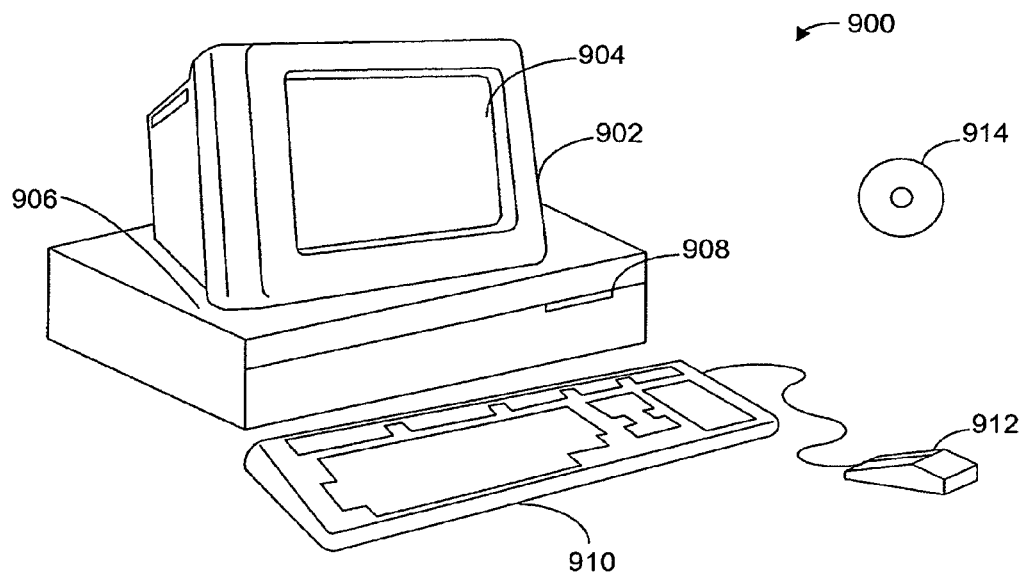
FIGS. 10A and 10B illustrate a computer system 900 suitable for implementing embodiments of the present invention.
Figure 10B:
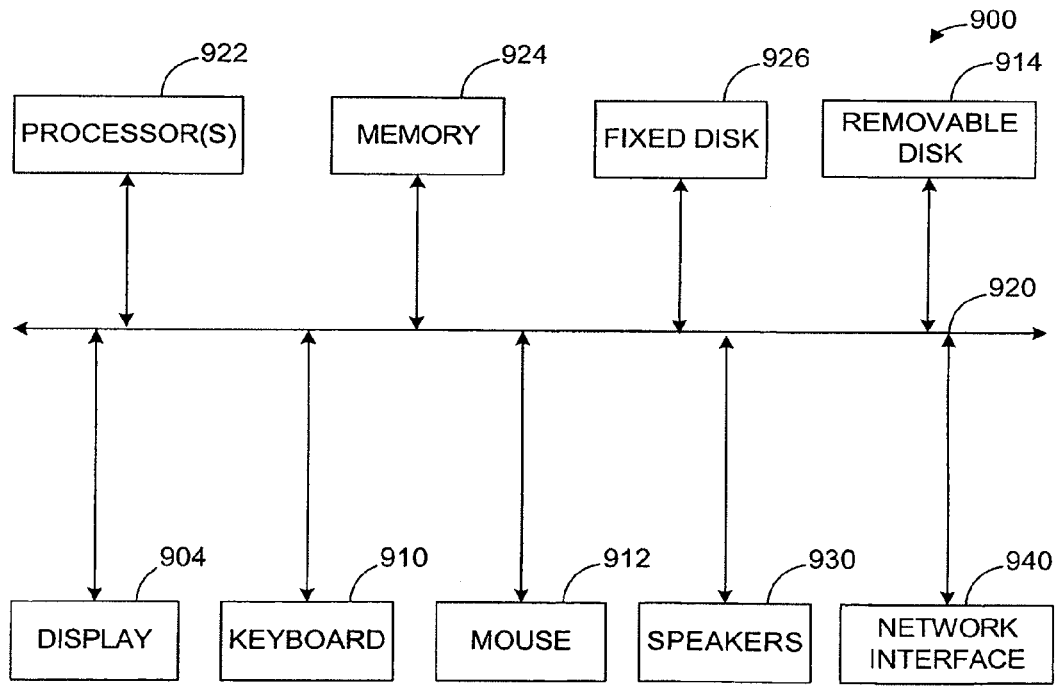

FIGS. 10A and 10B illustrate a computer system 900 suitable for implementing embodiments of the present invention. FIG. 10A shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 10B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of transferring funds from a sender to a recipient, the method comprising:

receiving, at a service provider computer, a plurality of payment details for a transaction to transfer funds from a sender account to a recipient account, wherein the plurality of payment details includes an identifier of the sender account, an identifier of the recipient, and a transfer amount, and wherein the service provider computer is operated by a service provider that is distinct from the sender, the recipient, and an issuer of the sender account;

conducting preliminary checks, by the service provider computer, to determine if the transaction can be completed, the preliminary checks including verifying the identifier of the sender account;

performing, by the service provider computer, an authentication process to determine if the sender is authenticated, the authentication process including receipt of a security token from the sender via a user interface;

generating, by the service provider computer, an authorization request message that includes an indication that authentication of the sender using the authentication process was successful, a processing code, a merchant type code, and a transaction ID;

transmitting, by the service provider computer, the authorization request message to the issuer of the sender account to authorize the transaction using the processing code, the merchant type code, and the transaction ID;

receiving, at the service provider computer, an authorization response message from the issuer of the sender account, the authorization response message indicating that the issuer of the sender account successfully authorized the transaction;

providing, by the service provider computer, a confirmation message to the sender, the confirmation message indicating that the transaction has been authorized; and transmitting, by the service provider computer, a funds transfer message to an issuer of the recipient account, the funds transfer message indicating that the transfer amount is to be added to the recipient account, wherein the service provider receives the transfer amount plus any fees charged by the service provider from the issuer of the sender account, and wherein the service provider transmits the transfer amount to the issuer of the recipient account.

2. The method of claim 1 wherein the confirmation message further indicates that authentication of the sender using the authentication process was successful.

3. The method of claim 1 wherein the authorization request message is an account funding transaction authorization request message.

4. The method of claim 1 wherein the identifier of the sender account comprises an account number corresponding to the sender account and associated with a payment card, and wherein the plurality of payment details further comprise an expiration date for the payment card, an indication of the type of payment card, and the sender's name.

5. The method of claim 1 wherein the plurality of payment details further comprise an indication by the senders of a choice of funds transfer options.

6. The method of claim 5 wherein the funds transfer options comprise cash or a prepaid card.

7. The method of claim 1 wherein performing the authentication process includes initiating, by the service provider computer, an authentication service.

8. The method of claim 7 wherein the authentication service uses a directory server and an access control server, and wherein the access control server is operated by the issuer of the sender account.

9. The method of claim 1 wherein the service provider is a service provider bank.

10. The method of claim 1 wherein the recipient receives a prepaid card in an amount substantially equal to the transfer amount.

11. The method of claim 1 wherein the authorization request message further includes a mail order/telephone order/electronic commerce code.

12. The method of claim 1 wherein the authorization request message does not include an identifier of the recipient.

13. The method of claim 1 wherein the confirmation message further indicates a currency exchange rate.

14. A computer comprising:

a processor; and a non-transitory computer readable medium coupled to the processor, the non-transitory computer readable medium comprising code executable by the processor for performing a method of transferring funds from a sender to a recipient, the method comprising:

receiving, at the computer, a plurality of payment details for a transaction to transfer funds from a sender account to a recipient account, wherein the plurality of payment details includes an identifier of the sender account, an identifier of the recipient, and a transfer amount, and wherein the computer is operated by a service provider that is distinct from the sender, the recipient, and an issuer of the sender account;

conducting preliminary checks, by the computer, to determine if the transaction can be completed, the preliminary checks including verifying the identifier of the sender account;

performing, by the computer, an authentication process to determine if the sender is authenticated, the authentication process including receipt of a security token from the sender via a user interface;

generating, by the computer, an authorization request message that includes an indication that authentication of the sender using the authentication process was successful, a processing code, a merchant type code, and a transaction ID;

transmitting, by the computer, the authorization request message to the issuer of the sender account to authorize the transaction using the processing code, the merchant type code, and the transaction ID;

receiving, at the computer, an authorization response message from the issuer of the sender account, the authorization response message indicating that the issuer of the sender account successfully authorized the transaction;

providing, by the computer, a confirmation message to the sender, the confirmation message indicating that the transaction has been authorized; and transmitting, by the computer, a funds transfer message to an issuer of the recipient account, the funds transfer message indicating that the transfer amount is to be added to the recipient account, wherein the service provider receives the transfer amount plus any fees charged by the service provider from the issuer of the sender account, and wherein the service provider transmits the transfer amount to the issuer of the recipient account.

15. The computer of claim 14 wherein the confirmation message further indicates that authentication of the sender using the authentication process was successful.

16. The computer of claim 14 wherein the authorization request message is an account funding transaction authorization request message.

17. The computer of claim 14 wherein the identifier of the sender account comprises an account number corresponding to the sender account and associated with a payment card, and wherein the plurality of payment details further comprise an expiration date for the payment card, an indication of the type of payment card, and the sender's name.

18. The computer of claim 14 wherein the plurality of payment details further comprise an indication by the sender of a choice of funds transfer options.

19. The computer of claim 18 wherein the funds transfer options comprise cash or a prepaid card.

20. The computer of claim 14 wherein performing the authentication process includes initiating, by the computer, an authentication service.

21. The computer of claim 20 wherein the authentication service uses a directory server and an access control server, and wherein the access control server is operated by the issuer of the sender account.

22. The computer of claim 14 wherein the service provider is a service provider bank.

23. The computer of claim 14 wherein the recipient receives a prepaid card in an amount substantially equal to the transfer amount.

\* \* \* \* \*